United States Patent Office 3,355,396
Patented Nov. 28, 1967

3,355,396
PRODUCTION OF SILICA-ALUMINA HYDROGEL-ALUMINA HYDROGEL CRACKING CATALYSTS
Robert R. Otremba, Chicago, and George C. Atteberry, Villa Park, Ill., assignors to Nalco Chemical Company, Chicago, Ill., a corporation of Delaware
No Drawing. Filed Nov. 4, 1963, Ser. No. 321,318
6 Claims. (Cl. 252—440)

ABSTRACT OF THE DISCLOSURE

Processes for producing silica-alumina hydrogel-alumina hydrogel cracking catalysts by combining partially washed alumina hydrogel with silica-alumina hydrogel, the latter having 65–75% by weight silica and 25–35% by weight alumina, and the combined hydrogels having 40–55% by weight alumina.

---

This invention, in general, relates to processes for preparing improved cracking catalysts. More particularly, the invention pertains to processes for producing synthetic xerogel cracking catalysts made from silica-alumina hydrogel and alumina hydrogel wherein said hydrogels are combined in proper proportions in the wet state before drying the combined hydrogels into xerogel cracking catalysts.

Synthetic silica-alumina xerogel cracking catalysts are well known in the art. This invention relates to processes to produce improved xerogel catalysts. The synthetic xerogel catalysts comprise a combination of the silica-alumina xerogel having a silica content, as $SiO_2$, in the order of 65–75% by weight and an alumina content, as $Al_2O_3$, in the order of 25–35% by weight (dry basis) and an alumina xerogel. The latter alumina is employed in an amount to provide in the final catalyst a total alumina content, including the alumina in the silica-alumina portion of the catalyst, in the range of about 40–55%, as $Al_2O_3$ (dry basis). The foregoing percentages are based on the total silica gel and alumina gel (dry basis) in the catalyst, exclusive of diluents, salts, etc.

It is a primary object of this invention to provide processes for producing cracking catalysts with improved physical and catalytic properties.

Another object of this invention is to provide processes for producing xerogel cracking catalysts which have a good activity maintenance after exposures to high temperature steam deactivation conditions.

Still another object of the invention is to provide processes for producing cracking catalysts which have good surface area and pore volume characteristics.

Still another object of the invention is to provide improvements in techniques of manufacture of the catalysts in accord with the following description.

Broadly, the process involves the preparation separately of a silica-alumina hydrogel and an alumina hydrogel, followed by the mixing of the two separately prepared, precipitated hydrogels, and thereafter spray drying or drying by other techniques the catalyst mixture to provide a xerogel cracking catalyst. A silica hydrogel may be prepared by the precipitation of silica hydrogel from an alkali metal silicate solution with an acid such as sulfuric acid. Then alum solution may be added to the silica hydrogel slurry. The alumina is then precipitated by raising the pH into the alkaline range by the addition of sodium aluminate solution or by the addition of a base such as ammonium hydroxide. The resultant silica-alumina hydrogel slurry may be washed at this stage to remove sodium and sulfate ion, but this is not essential. Techniques for preparing the silica-alumina hydrogels are well known in the art, and any of these techniques may be used in the practice of the invention.

The alumina hydrogel to be combined with the silica-alumina hydrogel is prepared separately from the silica-alumina hydrogel. This alumina hydrogel may be prepared, for example, by precipitation of alumina at alkaline pH by mixing alum with sodium aluminate in aqueous solution or with a base such as soda ash, ammonia, etc. The alumina hydrogel preferably is filtered prior to its combination with the silica-alumina hydrogel. The alumina hydrogel filter cake is water-washed to remove 35–65% by weight of the electrolyte residue, i.e., sodium and sulfate ions, present in the aqueous gel. The sodium remaining in the partially washed alumina hydrogel is in the range of about 5–12% by weight based on the alumina, as $Al_2O_3$, and the sulfate remaining therein is in the range of 7–18% by weight, based on the alumina, as $Al_2O_3$. Thereafter the aqueous alumina gel is ready for mixing with the silica-alumina hydrogel.

The hydrogels are combined, and the combined hydrogel slurry is stirred continuously until a uniform mixing is attained, usually a mixing period in the order of 30–60 minutes being sufficient. The hydrogel slurry is brought to about 8–14% solids in preparation for spray drying, and the combined hydrogels are spray dried into xerogel, microspherical bodies. The spray dried xerogel is washed with water and, if desired, aqueous ammonia to bring its sodium content, as $Na_2O$, to a preferred value of about 0.04% by weight or below and its sulfate content to a preferred value of about 0.7% by weight or below. The washed xerogel is then redried. The spray dried microspheres may be used in fluid bed cracking processes, or they may be moistened and extruded or pelleted to provide macrosize pills, rods, etc., used in fixed or moving bed cracking processes. If desired, the partially dewatered hydrogels may be extruded or pelleted and then dried.

The silica-alumina gel portion of the catalyst composites produced by the process of the invention has a silica content in the order of 65–75% and an alumina content in the order of 25–35% (dry basis). Silica-alumina xerogel cracking catalysts known in the prior art are not appreciably, if at all, enhanced by making the alumina content much above 25–27%, but in the silica-alumina gel-alumina gel catalysts produced by the invention an alumina content of 30–35%, as $Al_2O_3$, in the silica-alumina portion of the catalyst composite yields better over-all catalysts than ones with 25–27% alumina in the silica-alumina portion of the catalyst composite. We, accordingly, prefer to use silica alumina gels of 65–70% silica, as $SiO_2$, and 30–35% alumina, as $Al_2O_3$ (dry basis). The gels are combined in a ratio such that the resultant gel mixture contains 45–60% silica and 40–55% alumina (dry basis based on the total hydrogel content).

Preferred embodiments of the process invention herein are set forth in the following examples.

Example 1

An alumina hydrogel is prepared as follows:

In a tank containing 5700 gallons of water at 84° F. are dissolved 300 lbs. of soda ash. When the soda ash has been dissolved, 180 gallons of a 39% concentration aqueous sodium aluminate solution are pumped into the tank in about a 15-minute period. The contents of the tank are at about 84° F. Six hundred gallons of aqueous aluminum sulfate of 7.8% concentration, as $Al_2O_3$, are added to the admixture over an 80-minute period with water of dilution in conjunction with and in addition thereto diluting the reaction mass at a rate of 25 gallons per-minute.

The pH of the resulting aqueous reaction mass is adjusted to 8.0 with about 75 gallons of 39% concentration aqueous sodium aluminate solution which, while being added, is also diluted continuously with water at a rate of 35 gallons per minte over a 7½-minute addition period. The contents of the tank are heated to about 100° F. and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum.

*Example II*

A silica-alumina hydrogel is prepared by the following technique.

To a batch tank is added 4,275 gallons of water preheated to 90° F., and 865 gallons of sodium silicate solution (28.8% weight percent $SiO_2$, 40–41.5 Baumé at 68° F. and $Na_2O:SiO_2$ ratio of 1:3.2) is added. The batch is stirred for five minutes. The concentration of the sodium silicate, as $SiO_2$, in the batch is 6.3 weight percent.

With the batch at 90° F., 302 gallons of 34.5 weight percent sulfuric acid solution at 182° F. are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes whereupon 205 gallons of sodium aluminate solution (24.4 weight percent as $Al_2O_3$) diluted in 1080 gallons of water is added over a period of 17 minutes. After all the sodium aluminate is added, the pH is checked. It should be between 5.0 and 5.2. The alumina content of the silica-alumina hydrogel is 30–31%.

*Example III*

The silica-alumina hydrogel product of Example II and 1740 gallons of the alumina hydrogel filter cake of Example I are mixed together for one hour. The finished batch has a pH of 5.5 to 5.6 and a temperature of about 110° F. The aqueous gel mixture is then pumped to a dewatering filter, and the filter cake from said dewatering filter and a portion of aqueous gel are blended to give a gel slurry of about 14 weight percent solids. The hydrogel mixture is spray dried in a spray drier conventionally used in catalyst manufacture. The inlet temperature may be in the order of 420° F. and the outlet temperature may be in the order of 250° F.

After spray-drying the microspherical xerogel particles are purified by using a warm water wash (130–140° F.) and approximately 8 gallons of warm water per pound of the spray dried catalyst, followed by an ammonia treatment. The samples are then dried.

The following data relates to cracking operations employing the silica-alumina hydrogel-alumina hydrogel catalysts produced by practicing the process of the invention and also employing previously known catalysts, i.e., silica-alumina catalysts having in the order of 25–27% alumina. The latter catalysts are not prepared with added alumina hydrogel. The catalysts of the invention had an alumina content, as $Al_2O_3$, of about 31% in the silica-alumina portion of the catalyst composite and a total alumina content, as $Al_2O_3$, of about 43%.

The following results are based on spray-dried microspherical cracking catalysts which were deactivated in the presence of atmospheric steam for 6 hours at 1450° F. A U.O.P. relative activity test was then made on the steam-treated samples.

|  | U.O.P. Activity Rating | | |
|---|---|---|---|
|  | Vol. | ABD | Wt. |
| Silica-Alumina Xerogel Catalyst | 52 | .50 | 52 |
| Silica-Alumina and Alumina Xerogel Catalyst | 59 | .40 | 74 |

The following results are based on the same types of catalysts which were deactivated in the presence of 60 lbs. steam for 6 hours at 1200° F. The results are expressed in terms of U.O.P. relative activity.

|  | U.O.P. Activity Rating | | |
|---|---|---|---|
|  | Vol. | ABD | Wt. |
| Silica-Alumina Xerogel Catalyst | 45 | .48 | 47 |
| Silica-Alumina Xerogel, nickel poisoned [1] | 48 | .56 | 43 |
| Silica-Alumina Xerogel-Alumina Xerogel Catalyst | 58 | .44 | 66 |
| Silica-Alumina Xerogel-Alumina Xerogel, nickel poisoned [2] | 53 | .46 | 58 |

[1] 0.048% Ni.
[2] 0.040% Ni.

The above data further demonstrates the enhanced activity maintenance after steam deactivation under a different set of steam deactivation conditions. The results also show the comparative activities of the catalysts after nickel poisoning.

In the following table will be found the selectivity results of the pertinent catalysts. The samples, prior to running in the test unit, were treated with 60 lbs. steam for 6 hours at 1200° F. The effect of nickel on the silica-alumina xerogel catalyst and in terms of selectivity is shown by comparing Catalysts I and II. The presence of nickel gives a lower gasoline yield and an increase in the hydrogen and coke yields. Catalyst III is a catalyst of the invention. Comparison of Catalysts I and III showed essentially the same type of selectivity; however, when comparing catalyst number IV (nickel-poisoned Catalyst III) with Catalysts I and II the tolerance to nickel poisoning of Catalyst IV becomes apparent.

Catalyst IV gave approximately the same gasoline yield as the unpoisoned catalysts. It produced a slightly higher hydrogen and coke yield but not of the same magnitude as that of catalyst number II.

|  | Catalyst No. | | | |
|---|---|---|---|---|
|  | I | II | III | IV |
| Catalyst Description | ($SiO_2$-$Al_2O_3$) | ($SiO_2$-$Al_2O_3$+Ni)[1] | ($SiO_2$-$Al_2O_3$+$Al_2O_3$) | ($SiO_2$-$Al_2O_3$+$Al_2O_3$+Ni)[2] |
| Wt. Percent Conversion | 65.6 | 69 | 67.1 | 68.9 |
| Wt. Percent $C_5$–400 Gasoline | 36.5 | 34.5 | 36.3 | 36.3 |
| Hydrogen (Ft.³/Bbl.) | 74 | 212 | 69 | 134 |
| Hydrogen Producing Factor | 0.40 | 1.17 | 0.38 | 0.75 |
| Coke (Referred to Feed) | 6.16 | 9.79 | 6.54 | 7.44 |

[1] 0.018% Ni.
[2] 0.040% Ni.

The separate water washing of the alumina hydrogel contributes beneficial properties to the resultant catalyst as compared against properties of a similar catalyst in which the alumina hydrogel is either, not washed or is washed so thoroughly as to remove essentially all of the residual electrolyte content. The following data illustrates the advantages attainable by separate water washing of the alumina hydrogel portion of the catalyst composite to remove some, but not all, of the residual electrolyte content thereof prior to combining said hydrogel with the silica-alumina hydrogel.

*Example IV*

Catalyst composites were prepared according to the procedures set forth in Examples I–III. These catalysts had the following composition and properties:

|  | A | B | C | D |
|---|---|---|---|---|
| L.O.I. | 22.2 | 38.4 | 15.0 | 14.7 |
| $Al_2O_3$ (percent) | 46.7 | 44.7 | 43.3 | 43.8 |
| $Na_2O$ (percent) | .039 | .024 | .094 | .038 |
| $SO_4$ (percent) | .39 | .22 | 1.77 | .41 |
| S.A. | 435 | 530 | 405 | 490 |
| P.V. | .70 | .87 | .94 | .93 |
| Initial Activity: |  |  |  |  |
| Vol. | 80 | 77 | 74 | (¹) |
| ABD | .46 | .39 | .36 | (¹) |
| Wgt. | 87 | 99 | 103 | (¹) |
| Gas grav. | 1.30 | 1.24 | 1.12 | (¹) |
| Steamed Activity: |  |  |  |  |
| Vol. | 57 | 59 | 62 | 64 |
| ABD | .48 | .40 | .39 | .39 |
| Wgt. | 59 | 74 | 80 | 82 |
| Gas grav. | 1.18 | 1.03 | 1.07 | (¹) |
| S.A. | 205 | (¹) | 265 | 330 |
| P.V. ($CCl_4$) | .46 | (¹) | .90 | .88 |

¹ Data not determined or unreliable.

The steamed activity values were determined after steaming the catalyst for six hours at 1450° F. The alumina content of the silica-alumina hydrogel components of the catalysts was 28% (dry basis).

As is apparent from Examples I–III, the above catalysts are prepared by a procedure, broadly speaking, involving the separate formation of an alumina hydrogel and a silica-alumina hydrogel. The silica-alumina hydrogel per se is not water washed. The alumina hydrogel is or is not water washed according to the information which follows. The hydrogels are combined, dewatered, and spray dried. The spray-dried particles are thereafter washed with water and dried.

The above table shows the physical and catalytic properties of four catalysts. In the preparation of Catalyst A, the alumina hydrogel was thoroughly washed with water to remove as much residual electrolyte as possible. The electrolyte is essentially sodium ion and sulfate ion. The washed alumina hydrogel used in Catalyst A contained 0.36% by weight of sodium, as $Na_2O$, based on the weight of the alumina, as $Al_2O_3$ and contained, on the same basis, 1.5% by weight sulfate, as $SO_4$.

The alumina hydrogel used in Catalyst B was dewatered but was not water washed. It contained 18.7% by weight sodium, as $Na_2O$, based on the weight of alumina, as $Al_2O_3$, and 25.4% sulfate, as $SO_4$, on the same basis.

Catalysts C and D are representative of catalysts produced by the process invention herein. Catalysts C and D contained, on the same basis as for Catalysts A and B, 7.9% by weight sodium, as $Na_2O$, and 12.7% by weight sulfate as $SO_4$. The preparation of Catalyst D involved an additional rewashing and drying of the Catalyst C composite xerogel to reduce the sodium and sulfate content of the final catalyst to the values shown in the table. Catalysts C and D are better catalysts than Catalysts A and B, as can be seen from the foregoing table. In the preparation of Catalyst C and D, the alumina hydrogel was washed by spraying water on the hydrogel filter cake on the drum slurries as described in Example I.

The preparation of Catalysts C and D differs from that of Catalysts A and B in that the alumina hydrogel was washed only enough to remove a portion (i.e., 35–65%, specifically in the order of 50%) of the residual electrolyte, deliberately leaving the remainder of the electrolyte in the alumina hydrogel. The improvements afforded thereby are substantial.

The invention is hereby claimed as follows:

1. A process for manufacture of a cracking catalyst which comprises mixing a silica-alumina hydrogel containing on a dry basis about 65–75% by weight of silica, as $SiO_2$, and 25–35% by weight of alumina, as $Al_2O_3$, with an alumina hydrogel in an amount sufficient to provide in the mixture a total alumina content, as $Al_2O_3$, of 40–55% by weight on a dry basis, washing said alumina hydrogel with water to remove a portion of the water-soluble electrolyte residues therein prior to mixing of said alumina hydrogel and said silica-alumina hydrogel, said residues comprising sodium ion and sulfate, said residues being 35–65% by weight of the sodium ion, as $Na_2O$, and 35–65% by weight of sulfate ion present in the hydrogel prior to washing, drying the resultant hydrogel mixture to produce a xerogel, and washing the xerogel with water to remove residual electrolyte therein.

2. A process as claimed in claim 1 wherein the silica content, as $SiO_2$, of said silica-alumina hydrogel is 65–70% and the alumina content, as $Al_2O_3$, thereof is 30–35%, said percentages being on a dry basis.

3. A process for manufacture of a cracking catalyst which comprises forming an alumina hydrogel by precipitation at an alkaline pH sodium aluminate in aqueous solution by the addition of aqueous alum solution, washing the formed alumina hydrogel with water to remove residual electrolyte therein, said washing being carried out so as to leave in the washed alumina hydrogel residual sodium ion, as $Na_2O$, in an amount of 35–65% by weight of the sodium ion present in the hydrogel prior to said washing, and residual sulfate, as $SO_4$, in an amount of 35–65% by weight of the sulfate ion present in the hydrogel prior to said washing, combining the washed alumina hydrogel with a silica-alumina hydrogel composite containing on a dry basis about 65–75% by weight silica, as $SiO_2$, and 25–35% by weight alumina, as $Al_2O_3$, the amount of alumina hydrogel combined with the silica-alumina hydrogel being sufficient to raise the alumina content in the combined hydrogels in the range of 40–55% by weight on a dry basis, drying the resultant hydrogel mixture to produce a xerogel, and washing the xerogel with water to remove residual electrolyte.

4. A process as claimed in claim 3 wherein the xerogel is washed with sufficient water to reduce the sodium content, as $Na_2O$, to a value not substantially exceeding 0.04% by weight and the sulfate content to a value not substantially exceeding 0.7% by weight.

5. A process as claimed in claim 3 wherein said alumina hydrogel is dewatered on a filter, and the alumina hydrogel filter cake is sprayed with water to perform said water washing step.

6. A process for manufacture of a cracking catalyst which comprises forming an alumina hydrogel by precipitation at an alkaline pH of sodium aluminate in aqueous solution by the addition of aqueous alum solution, washing the formed alumina hydrogel with water to remove residual electrolyte therein, said washing being carried out so as to leave in the washed alumina hydrogel residual sodium ion, as $Na_2O$, in an amount of 5–12% by weight, based on the alumina hydrogel, and residual sulfate, as $SO_4$, in an amount of 7–18% by weight, based on the alumina hydrogel, combining the washed alumina hydrogel with a silica-alumina hydrogel composite containing on a dry basis about 65–75% by weight silica, as $SiO_2$, and 25–35% by weight alumina, as $Al_2O_3$, the amount of alumina hydrogel combined with the silica-alumina hydrogel being sufficient to raise the alumina content in the combined hydrogels in the range of 40–55% by weight on a dry basis, drying the resultant hydrogel mixture to produce a xerogel, and washing xerogel with water to remove residual electrolyte.

References Cited

UNITED STATES PATENTS

| | | | |
|---|---|---|---|
| 2,935,463 | 5/1960 | Secor et al. | 208—120 |
| 3,034,994 | 5/1962 | Braithwaite et al. | 252—455 X |
| 3,260,681 | 7/1966 | Sanford et al. | 252—455 |

DANIEL E. WYMAN, *Primary Examiner.*

C. F. DEES, *Assistant Examiner.*

UNITED STATES PATENT OFFICE
CERTIFICATE OF CORRECTION

Patent No. 3,355,396                              November 28, 1967

Robert R. Otremba et al.

It is certified that error appears in the above identified patent and that said Letters Patent are hereby corrected as shown below:

Column 4, last table, second column, line 5 thereof, "6.16" should read -- 6.26 --.

Signed and sealed this 28th day of October 1969.

(SEAL)
Attest:

Edward M. Fletcher, Jr.
Attesting Officer

WILLIAM E. SCHUYLER, JR.
Commissioner of Patents